(12) United States Patent
Laxman et al.

(10) Patent No.: US 9,866,478 B2
(45) Date of Patent: Jan. 9, 2018

(54) TECHNIQUES FOR USER-DEFINED TAGGING OF TRAFFIC IN A NETWORK VISIBILITY SYSTEM

(71) Applicant: Extreme Networks, Inc., San Jose, CA (US)

(72) Inventors: Latha Laxman, San Jose, CA (US); Vishal Seth, Cupertino, CA (US); Arvindsrinivasan Lakshmi Narasimhan, San Jose, CA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 14/848,677

(22) Filed: Sep. 9, 2015

(65) Prior Publication Data

US 2016/0285763 A1    Sep. 29, 2016

Related U.S. Application Data

(60) Provisional application No. 62/137,106, filed on Mar. 23, 2015.

(51) Int. Cl.
*H04W 4/00* (2009.01)
*H04L 12/741* (2013.01)
(Continued)

(52) U.S. Cl.
CPC ........ *H04L 45/745* (2013.01); *H04L 12/4633* (2013.01); *H04L 12/4641* (2013.01); *H04L 43/00* (2013.01); *H04L 69/22* (2013.01)

(58) Field of Classification Search
CPC ....... H04L 45/72; H04L 45/74; H04L 45/741; H04L 45/742; H04L 45/745; H04L 12/4633; H04L 12/4641; H04L 12/4645; H04L 43/00; H04L 43/04; H04L 43/08; H04L 69/22
See application file for complete search history.

(56) References Cited

U.S. PATENT DOCUMENTS 5,031,094 A    7/1991 Toegel et al.
5,359,593 A    10/1994 Derby et al.
(Continued)

FOREIGN PATENT DOCUMENTS

CN    101677292    3/2010
EP    2654340 A1    10/2013
(Continued)

OTHER PUBLICATIONS

Notice of Allowance for U.S. Appl. No. 14/030,782 dated Nov. 16, 2015, 20 pages.
(Continued)

*Primary Examiner* — Kevin Mew
(74) *Attorney, Agent, or Firm* — Haley Guiliano LLP (57) ABSTRACT

In one embodiment, a data plane component of the network visibility system can receive a data packet tapped from a source network. The data plane component can further match the data packet with an entry in a rule table, where the entry includes one or more match parameters, and in response to the matching can tag the data packet with a zone identifier defined in the entry. The data plane component can then forward the tagged data packet to an analytic server for analysis.

17 Claims, 7 Drawing Sheets

(51) Int. Cl.
    *H04L 29/06* (2006.01)
    *H04L 12/46* (2006.01)
    *H04L 12/26* (2006.01)

(56) References Cited

U.S. PATENT DOCUMENTS

| | | |
|---|---|---|
| 5,948,061 A | 9/1999 | Merriman et al. |
| 5,951,634 A | 9/1999 | Sitbon et al. |
| 6,006,269 A | 12/1999 | Phaal |
| 6,006,333 A | 12/1999 | Nielsen |
| 6,078,956 A | 6/2000 | Bryant et al. |
| 6,092,178 A | 7/2000 | Jindal et al. |
| 6,112,239 A | 8/2000 | Kenner et al. |
| 6,115,752 A | 9/2000 | Chauhan |
| 6,128,279 A | 10/2000 | O'Neil et al. |
| 6,128,642 A | 10/2000 | Doraswamy et al. |
| 6,148,410 A | 11/2000 | Baskey et al. |
| 6,167,445 A | 12/2000 | Gai et al. |
| 6,167,446 A | 12/2000 | Lister et al. |
| 6,182,139 B1 | 1/2001 | Brendel |
| 6,195,691 B1 | 2/2001 | Brown |
| 6,205,477 B1 | 3/2001 | Johnson et al. |
| 6,233,604 B1 | 5/2001 | Van Horne et al. |
| 6,260,070 B1 | 7/2001 | Shah |
| 6,286,039 B1 | 9/2001 | Van Horne et al. |
| 6,286,047 B1 | 9/2001 | Ramanathan et al. |
| 6,304,913 B1 | 10/2001 | Rune |
| 6,324,580 B1 | 11/2001 | Jindal et al. |
| 6,327,622 B1 | 12/2001 | Jindal et al. |
| 6,336,137 B1 | 1/2002 | Lee et al. |
| 6,381,627 B1 | 4/2002 | Kwan et al. |
| 6,389,462 B1 | 5/2002 | Cohen et al. |
| 6,427,170 B1 | 7/2002 | Sitaraman et al. |
| 6,434,118 B1 | 8/2002 | Kirschenbaum |
| 6,438,652 B1 | 8/2002 | Jordan et al. |
| 6,446,121 B1 | 9/2002 | Shah et al. |
| 6,449,657 B2 | 9/2002 | Stanbach, Jr. et al. |
| 6,470,389 B1 | 10/2002 | Chung et al. |
| 6,473,802 B2 | 10/2002 | Masters |
| 6,480,508 B1 | 11/2002 | Mwikalo et al. |
| 6,490,624 B1 | 12/2002 | Sampson et al. |
| 6,549,944 B1 | 4/2003 | Weinberg et al. |
| 6,567,377 B1 | 5/2003 | Vepa et al. |
| 6,578,066 B1 | 6/2003 | Logan et al. |
| 6,606,643 B1 | 8/2003 | Emens et al. |
| 6,665,702 B1 | 12/2003 | Zisapel et al. |
| 6,671,275 B1 | 12/2003 | Wong et al. |
| 6,681,232 B1 | 1/2004 | Sistanizadeh et al. |
| 6,681,323 B1 | 1/2004 | Fontanesi et al. |
| 6,691,165 B1 | 2/2004 | Bruck et al. |
| 6,697,368 B2 | 2/2004 | Chang et al. |
| 6,735,218 B2 | 5/2004 | Chang et al. |
| 6,745,241 B1 | 6/2004 | French et al. |
| 6,751,616 B1 | 6/2004 | Chan |
| 6,754,706 B1 | 6/2004 | Swildens et al. |
| 6,772,211 B2 | 8/2004 | Lu et al. |
| 6,779,017 B1 | 8/2004 | Lamberton et al. |
| 6,789,125 B1 | 9/2004 | Aviani et al. |
| 6,821,891 B2 | 11/2004 | Chen et al. |
| 6,826,198 B2 | 11/2004 | Turina et al. |
| 6,831,891 B2 | 12/2004 | Mansharamani et al. |
| 6,839,700 B2 | 1/2005 | Doyle et al. |
| 6,850,984 B1 | 2/2005 | Kalkunte et al. |
| 6,874,152 B2 | 3/2005 | Vermeire et al. |
| 6,879,995 B1 | 4/2005 | Chinta et al. |
| 6,898,633 B1 | 5/2005 | Lyndersay et al. |
| 6,901,072 B1 | 5/2005 | Wong |
| 6,901,081 B1 | 5/2005 | Ludwig |
| 6,920,498 B1 | 7/2005 | Gourlay et al. |
| 6,928,485 B1 | 8/2005 | Krishnamurthy et al. |
| 6,944,678 B2 | 9/2005 | Lu et al. |
| 6,963,914 B1 | 11/2005 | Breitbart et al. |
| 6,963,917 B1 | 11/2005 | Callis et al. |
| 6,985,956 B2 | 1/2006 | Luke et al. |
| 6,987,763 B2 | 1/2006 | Rochberger et al. |
| 6,996,615 B1 | 2/2006 | McGuire |
| 6,996,616 B1 | 2/2006 | Leighton et al. |
| 7,000,007 B1 | 2/2006 | Valenti |
| 7,009,086 B2 | 3/2006 | Brown et al. |
| 7,009,968 B2 | 3/2006 | Ambe et al. |
| 7,020,698 B2 | 3/2006 | Andrews et al. |
| 7,020,714 B2 | 3/2006 | Kalyanaraman et al. |
| 7,028,083 B2 | 4/2006 | Levine et al. |
| 7,031,304 B1 | 4/2006 | Arberg et al. |
| 7,032,010 B1 | 4/2006 | Swildens et al. |
| 7,036,039 B2 | 4/2006 | Holland |
| 7,058,706 B1 | 6/2006 | Iyer et al. |
| 7,058,717 B2 | 6/2006 | Chao et al. |
| 7,062,642 B1 | 6/2006 | Langrind et al. |
| 7,086,061 B1 | 8/2006 | Joshi et al. |
| 7,089,293 B2 | 8/2006 | Grosner et al. |
| 7,095,738 B1 * | 8/2006 | Desanti ............ H04L 12/18 370/389 |
| 7,117,530 B1 | 10/2006 | Lin |
| 7,126,910 B1 | 10/2006 | Sridhar |
| 7,127,713 B2 | 10/2006 | Davis et al. |
| 7,136,932 B1 | 11/2006 | Schneider |
| 7,139,242 B2 | 11/2006 | Bays |
| 7,177,933 B2 | 2/2007 | Foth |
| 7,177,943 B1 * | 2/2007 | Temoshenko ...... H04L 12/66 370/389 |
| 7,185,052 B2 | 2/2007 | Day |
| 7,187,687 B1 | 3/2007 | Davis et al. |
| 7,188,189 B2 | 3/2007 | Karol et al. |
| 7,197,547 B1 | 3/2007 | Miller et al. |
| 7,206,806 B2 | 4/2007 | Pineau |
| 7,215,637 B1 | 5/2007 | Ferguson et al. |
| 7,225,272 B2 | 5/2007 | Kelley et al. |
| 7,240,015 B1 | 7/2007 | Karmouch et al. |
| 7,240,100 B1 | 7/2007 | Wein et al. |
| 7,254,626 B1 | 8/2007 | Kommula et al. |
| 7,257,642 B1 | 8/2007 | Bridger et al. |
| 7,260,645 B2 | 8/2007 | Bays |
| 7,266,117 B1 | 9/2007 | Davis |
| 7,266,120 B2 | 9/2007 | Cheng et al. |
| 7,277,954 B1 | 10/2007 | Stewart et al. |
| 7,292,573 B2 | 11/2007 | LaVigne et al. |
| 7,296,088 B1 | 11/2007 | Padmanabhan et al. |
| 7,321,926 B1 | 1/2008 | Zhang et al. |
| 7,424,018 B2 | 9/2008 | Gallatin et al. |
| 7,436,832 B2 | 10/2008 | Gallatin et al. |
| 7,440,467 B2 | 10/2008 | Gallatin et al. |
| 7,441,045 B2 | 10/2008 | Skene et al. |
| 7,450,527 B2 | 11/2008 | Ashwood Smith |
| 7,454,500 B1 | 11/2008 | Hsu et al. |
| 7,483,374 B2 | 1/2009 | Nilakantan et al. |
| 7,492,713 B1 | 2/2009 | Turner et al. |
| 7,506,065 B2 | 3/2009 | LaVigne et al. |
| 7,539,134 B1 * | 5/2009 | Bowes ............ H04L 1/0072 370/230 |
| 7,555,562 B2 | 6/2009 | See et al. |
| 7,558,195 B1 | 7/2009 | Kuo et al. |
| 7,574,508 B1 | 8/2009 | Kommula |
| 7,581,009 B1 | 8/2009 | Hsu et al. |
| 7,584,301 B1 | 9/2009 | Joshi |
| 7,587,487 B1 | 9/2009 | Gunturu |
| 7,606,203 B1 | 10/2009 | Shabtay et al. |
| 7,647,427 B1 | 1/2010 | Devarapalli |
| 7,657,629 B1 | 2/2010 | Kommula |
| 7,690,040 B2 | 3/2010 | Frattura et al. |
| 7,706,363 B1 | 4/2010 | Daniel et al. |
| 7,716,370 B1 | 5/2010 | Devarapalli |
| 7,720,066 B2 | 5/2010 | Weyman et al. |
| 7,720,076 B2 | 5/2010 | Dobbins et al. |
| 7,746,789 B2 | 6/2010 | Katoh et al. |
| 7,747,737 B1 | 6/2010 | Apte et al. |
| 7,756,965 B2 | 7/2010 | Joshi |
| 7,774,833 B1 | 8/2010 | Szeto et al. |
| 7,787,454 B1 | 8/2010 | Won et al. |
| 7,792,047 B2 | 9/2010 | Gallatin et al. |
| 7,835,348 B2 | 11/2010 | Kasralikar |
| 7,835,358 B2 | 11/2010 | Gallatin et al. |
| 7,840,678 B2 | 11/2010 | Joshi |
| 7,848,326 B1 | 12/2010 | Leong et al. |

(56) References Cited

U.S. PATENT DOCUMENTS

| | | |
|---|---|---|
| 7,889,748 B1 | 2/2011 | Leong et al. |
| 7,899,899 B2 | 3/2011 | Joshi |
| 7,940,766 B2 | 5/2011 | Olakangil et al. |
| 7,953,089 B1 | 5/2011 | Ramakrishnan et al. |
| 8,018,943 B1 | 9/2011 | Pleshek et al. |
| 8,208,494 B2 | 6/2012 | Leong |
| 8,238,344 B1 | 8/2012 | Chen et al. |
| 8,239,960 B2 | 8/2012 | Frattura et al. |
| 8,248,928 B1 | 8/2012 | Wang et al. |
| 8,270,845 B2 | 9/2012 | Cheung et al. |
| 8,315,256 B2 | 11/2012 | Leong et al. |
| 8,386,846 B2 | 2/2013 | Cheung |
| 8,391,286 B2 | 3/2013 | Gallatin et al. |
| 8,504,721 B2 | 8/2013 | Hsu et al. |
| 8,514,718 B2 | 8/2013 | Zijst |
| 8,537,697 B2 | 9/2013 | Leong et al. |
| 8,570,862 B1 | 10/2013 | Leong et al. |
| 8,615,008 B2 | 12/2013 | Natarajan et al. |
| 8,654,651 B2 | 2/2014 | Leong et al. |
| 8,824,466 B2 | 9/2014 | Won et al. |
| 8,830,819 B2 | 9/2014 | Leong et al. |
| 8,873,557 B2 | 10/2014 | Nguyen |
| 8,891,527 B2 | 11/2014 | Wang |
| 8,897,138 B2 | 11/2014 | Yu et al. |
| 8,953,458 B2 | 2/2015 | Leong et al. |
| 9,155,075 B2 | 10/2015 | Song et al. |
| 9,264,446 B2 | 2/2016 | Goldfarb et al. |
| 9,270,566 B2 | 2/2016 | Wang et al. |
| 9,270,592 B1* | 2/2016 | Sites ............... H04L 45/7453 |
| 9,294,367 B2 | 3/2016 | Natarajan et al. |
| 9,356,866 B1* | 5/2016 | Sivaramakrishnan H04L 45/7453 |
| 9,380,002 B2 | 6/2016 | Johansson et al. |
| 9,479,415 B2 | 10/2016 | Natarajan et al. |
| 9,565,138 B2 | 2/2017 | Chen et al. |
| 9,648,542 B2 | 5/2017 | Hsu et al. |
| 2001/0049741 A1 | 12/2001 | Skene et al. |
| 2001/0052016 A1 | 12/2001 | Skene et al. |
| 2002/0009081 A1* | 1/2002 | Sampath ............ H04L 12/462 370/389 |
| 2002/0018796 A1 | 2/2002 | Wironen |
| 2002/0023089 A1 | 2/2002 | Woo |
| 2002/0026551 A1 | 2/2002 | Kamimaki et al. |
| 2002/0038360 A1 | 3/2002 | Andrews et al. |
| 2002/0055939 A1 | 5/2002 | Nardone et al. |
| 2002/0059170 A1 | 5/2002 | Vange |
| 2002/0059464 A1 | 5/2002 | Hata et al. |
| 2002/0062372 A1 | 5/2002 | Hong et al. |
| 2002/0078233 A1 | 6/2002 | Biliris et al. |
| 2002/0091840 A1 | 7/2002 | Pulier et al. |
| 2002/0112036 A1 | 8/2002 | Bohannon et al. |
| 2002/0120743 A1 | 8/2002 | Shabtay et al. |
| 2002/0124096 A1 | 9/2002 | Loguinov et al. |
| 2002/0133601 A1 | 9/2002 | Kennamer et al. |
| 2002/0150048 A1 | 10/2002 | Ha et al. |
| 2002/0154600 A1 | 10/2002 | Ido et al. |
| 2002/0188862 A1 | 12/2002 | Trethewey et al. |
| 2002/0194324 A1 | 12/2002 | Guha |
| 2002/0194335 A1 | 12/2002 | Maynard |
| 2003/0023744 A1 | 1/2003 | Sadot et al. |
| 2003/0031185 A1 | 2/2003 | Kikuchi et al. |
| 2003/0035430 A1 | 2/2003 | Islam et al. |
| 2003/0065711 A1 | 4/2003 | Acharya et al. |
| 2003/0065763 A1 | 4/2003 | Swildens et al. |
| 2003/0105797 A1 | 6/2003 | Dolev et al. |
| 2003/0115283 A1 | 6/2003 | Barbir et al. |
| 2003/0135509 A1 | 7/2003 | Davis et al. |
| 2003/0202511 A1 | 10/2003 | Sreejith et al. |
| 2003/0210686 A1 | 11/2003 | Terrell et al. |
| 2003/0210694 A1 | 11/2003 | Jayaraman et al. |
| 2003/0229697 A1 | 12/2003 | Borella |
| 2004/0019680 A1 | 1/2004 | Chao et al. |
| 2004/0024872 A1 | 2/2004 | Kelley et al. |
| 2004/0032868 A1 | 2/2004 | Oda et al. |
| 2004/0064577 A1 | 4/2004 | Dahlin et al. |
| 2004/0194102 A1 | 9/2004 | Neerdaels |
| 2004/0243718 A1 | 12/2004 | Fujiyoshi |
| 2004/0249939 A1 | 12/2004 | Amini et al. |
| 2004/0249971 A1 | 12/2004 | Klinker |
| 2005/0021883 A1 | 1/2005 | Shishizuka et al. |
| 2005/0033858 A1 | 2/2005 | Swildens et al. |
| 2005/0060418 A1 | 3/2005 | Sorokopud |
| 2005/0060427 A1 | 3/2005 | Phillips et al. |
| 2005/0086295 A1 | 4/2005 | Cunningham et al. |
| 2005/0149531 A1 | 7/2005 | Srivastava |
| 2005/0169180 A1 | 8/2005 | Ludwig |
| 2005/0190695 A1 | 9/2005 | Phaal |
| 2005/0207417 A1 | 9/2005 | Ogawa et al. |
| 2005/0278565 A1 | 12/2005 | Frattura et al. |
| 2005/0286416 A1 | 12/2005 | Shimonishi et al. |
| 2006/0036743 A1 | 2/2006 | Deng et al. |
| 2006/0039374 A1 | 2/2006 | Belz et al. |
| 2006/0045082 A1 | 3/2006 | Fertell et al. |
| 2006/0143300 A1 | 6/2006 | See et al. |
| 2007/0044141 A1* | 2/2007 | Lor .................. H04L 63/0236 726/3 |
| 2007/0053296 A1 | 3/2007 | Yazaki et al. |
| 2007/0171918 A1* | 7/2007 | Ota .................. H04L 12/2856 370/395.53 |
| 2007/0195761 A1 | 8/2007 | Tatar et al. |
| 2007/0233891 A1 | 10/2007 | Luby et al. |
| 2008/0002591 A1 | 1/2008 | Ueno |
| 2008/0028077 A1* | 1/2008 | Kamata ............... H04L 12/4641 709/227 |
| 2008/0031141 A1 | 2/2008 | Lean et al. |
| 2008/0089336 A1 | 4/2008 | Mercier et al. |
| 2008/0137660 A1 | 6/2008 | Olakangil et al. |
| 2008/0159141 A1 | 7/2008 | Soukup et al. |
| 2008/0181119 A1 | 7/2008 | Beyers |
| 2008/0195731 A1 | 8/2008 | Harmel et al. |
| 2008/0225710 A1 | 9/2008 | Raja et al. |
| 2008/0304423 A1 | 12/2008 | Chuang et al. |
| 2009/0135835 A1 | 5/2009 | Gallatin et al. |
| 2009/0240644 A1 | 9/2009 | Boettcher et al. |
| 2009/0262745 A1 | 10/2009 | Leong et al. |
| 2010/0011126 A1 | 1/2010 | Hsu et al. |
| 2010/0135323 A1 | 6/2010 | Leong |
| 2010/0209047 A1 | 8/2010 | Cheung et al. |
| 2010/0228974 A1* | 9/2010 | Watts ................. H04L 12/4633 713/168 |
| 2010/0293296 A1 | 11/2010 | Hsu et al. |
| 2010/0325178 A1 | 12/2010 | Won et al. |
| 2011/0044349 A1 | 2/2011 | Gallatin et al. |
| 2011/0058566 A1 | 3/2011 | Leong et al. |
| 2011/0211443 A1 | 9/2011 | Leong et al. |
| 2011/0216771 A1 | 9/2011 | Gallatin et al. |
| 2012/0023340 A1 | 1/2012 | Cheung |
| 2012/0103518 A1 | 5/2012 | Kakimoto et al. |
| 2012/0157088 A1 | 6/2012 | Gerber et al. |
| 2012/0201137 A1 | 8/2012 | Le Faucheur et al. |
| 2012/0243533 A1 | 9/2012 | Leong |
| 2012/0257635 A1 | 10/2012 | Gallatin et al. |
| 2012/0275311 A1 | 11/2012 | Ivershen |
| 2013/0010611 A1 | 1/2013 | Cafarelli et al. |
| 2013/0028072 A1* | 1/2013 | Addanki ............. H04L 49/557 370/218 |
| 2013/0034107 A1 | 2/2013 | Leong et al. |
| 2013/0156029 A1 | 6/2013 | Gallatin et al. |
| 2013/0173784 A1 | 7/2013 | Wang et al. |
| 2013/0201984 A1 | 8/2013 | Wang |
| 2013/0259037 A1 | 10/2013 | Natarajan et al. |
| 2013/0272135 A1 | 10/2013 | Leong |
| 2014/0016500 A1 | 1/2014 | Leong et al. |
| 2014/0022916 A1 | 1/2014 | Natarajan et al. |
| 2014/0029451 A1 | 1/2014 | Nguyen |
| 2014/0040478 A1 | 2/2014 | Hsu et al. |
| 2014/0101297 A1 | 4/2014 | Neisinger et al. |
| 2014/0204747 A1 | 7/2014 | Yu et al. |
| 2014/0219100 A1 | 8/2014 | Pandey et al. |
| 2014/0233399 A1* | 8/2014 | Mann ................. H04L 41/0806 370/248 |
| 2014/0321278 A1 | 10/2014 | Cafarelli et al. |
| 2015/0009828 A1* | 1/2015 | Murakami ............ H04L 47/20 370/235 |

(56) References Cited

U.S. PATENT DOCUMENTS

| | | | |
|---|---|---|---|
| 2015/0009830 A1* | 1/2015 | Bisht | H04L 47/125 370/236 |
| 2015/0033169 A1 | 1/2015 | Lection et al. | |
| 2015/0103824 A1* | 4/2015 | Tanabe | H04L 65/4076 370/390 |
| 2015/0142935 A1 | 5/2015 | Srinivas et al. | |
| 2015/0170920 A1 | 6/2015 | Purayath et al. | |
| 2015/0180802 A1 | 6/2015 | Chen et al. | |
| 2015/0195192 A1 | 7/2015 | Vasseur et al. | |
| 2015/0207905 A1* | 7/2015 | Merchant | H04L 69/22 370/390 |
| 2015/0215841 A1 | 7/2015 | Hsu et al. | |
| 2015/0256436 A1 | 9/2015 | Stoyanov et al. | |
| 2015/0263889 A1 | 9/2015 | Newton | |
| 2015/0281125 A1* | 10/2015 | Koponen | H04L 45/64 711/122 |
| 2015/0319070 A1 | 11/2015 | Nachum | |
| 2016/0119234 A1* | 4/2016 | Valencia Lopez | H04L 45/745 370/401 |
| 2016/0149811 A1* | 5/2016 | Roch | H04L 45/745 370/392 |
| 2016/0164768 A1 | 6/2016 | Natarajan et al. | |
| 2016/0182329 A1 | 6/2016 | Armolavicius et al. | |
| 2016/0182378 A1 | 6/2016 | Basavaraja et al. | |
| 2016/0204996 A1 | 7/2016 | Lindgren et al. | |
| 2016/0248655 A1 | 8/2016 | Francisco et al. | |
| 2016/0285735 A1 | 9/2016 | Chen et al. | |
| 2016/0285762 A1 | 9/2016 | Chen et al. | |
| 2016/0308766 A1 | 10/2016 | Register et al. | |
| 2016/0373303 A1* | 12/2016 | Vedam | H04L 41/0886 |
| 2016/0373304 A1* | 12/2016 | Sharma | H04L 41/0893 |
| 2016/0373351 A1 | 12/2016 | Sharma et al. | |
| 2016/0373352 A1 | 12/2016 | Sharma et al. | |
| 2017/0187649 A1 | 6/2017 | Chen et al. | |
| 2017/0237632 A1 | 8/2017 | Hegde et al. | |
| 2017/0237633 A1 | 8/2017 | Hegde et al. | |

FOREIGN PATENT DOCUMENTS

| | | | |
|---|---|---|---|
| EP | 3206344 A2 | 8/2017 | |
| EP | 3206345 A2 | 8/2017 | |
| IE | 20070438 A1 | 2/2008 | |
| IN | 201641010295 | 3/2016 | |
| IN | 201641016960 | 5/2016 | |
| IN | 201641035761 | 10/2016 | |
| NO | 2015138513 A1 | 9/2015 | |
| WO | 2010135474 A1 | 11/2010 | |
| WO | 2015116538 A1 | 8/2015 | |

OTHER PUBLICATIONS

U.S. Appl. No. 14/848,586, filed Sep. 9, 2015 by Chen et al.
U.S. Appl. No. 14/848,645, filed Sep. 9, 2015 by Chen et al.
U.S. Appl. No. 60/169,502, filed Dec. 7, 2009 by Yeejang James Lin.
U.S. Appl. No. 60/182,812, filed Feb. 16, 2000 by Skene et al.
U.S. Appl. No. 09/459,815, filed Dec. 13, 1999 by Skene et al.
Notice of Allowance for U.S. Appl. No. 13/584,534 dated Dec. 16, 2015, 7 pages.
Delgadillo, "Cisco Distributed Director", White Paper, 1999, at URL:http://www-europe.cisco.warp/public/751/distdir/dd_wp.htm, (19 pages) with Table of Contents for TeleCon (16 pages).
Cisco LocalDirector Version 1.6.3 Release Notes, Oct. 1997, Cisco Systems, Inc. Doc No. 78-3880-05.
"Foundry Networks Announces Application Aware Layer 7 Switching on ServerIron Platform," (Mar. 1999).
Foundry ServerIron Installation and Configuration Guide (May 2000), Table of Contents—Chapter 1-5, http://web.archive.org/web/20000815085849/http://www.foundrynetworks.com/techdocs/SI/index.html.
Foundry ServerIron Installation and Configuration Guide (May 2000), Chapter 6-10, http://web.archive.org/web/20000815085849/http://www.foundrynetworks.com/techdocs/SI/index.html.
Foundry ServerIron Installation and Configuration Guide (May 2000), Chapter 11-Appendix C, http://web.archive.org/web/20000815085849/http://www.foundrynetworks.com/techdocs/SI/index.html.
Non-Final Office Action for U.S. Appl. No. 14/320,138 dated Feb. 2, 2016, 30 pages.
U.S. Appl. No. 14/927,478, filed Oct. 30, 2015 by Vedam et al.
U.S. Appl. No. 14/927,479, filed Oct. 30, 2015 by Sharma et al.
U.S. Appl. No. 14/927,482, filed Oct. 30, 2015 by Sharma et al.
U.S. Appl. No. 14/927,484, filed Oct. 30, 2015 by Sharma et al.
NGenius Subscriber Intelligence, http://www.netscout.com/uploads/2015/03NetScout_DS_Subscriber_Intelligence_SP.pdf, downloaded circa Mar. 23, 2015, pp. 1-6.
Xu et al.: Cellular Data Network Infrastructure Characterization and Implication on Mobile Content Placement, Sigmetrics '11 Proceedings of the ACM SIGMETRICS joint international conference on Measurement and modeling of computer systems, date Jun. 7-11, 2011, pp. 1-12, ISBN: 978-1-4503-0814-4 ACM New York, NY, USA copyright 2011.
E.H.T.B. Brands, Flow-Based Monitoring of GTP Trac in Cellular Networks, Date: Jul. 20, 2012, pp. 1-64, University of Twente, Enschede, The Netherlands.
Qosmos DeepFlow: Subscriber Analytics Use Case, http://www.qosmos.com/wp-content/uploads/2014/01/Qosmos-DeepFlow-Analytics-use-case-datasheet-Jan-2014.pdf, date Jan. 2014, pp. 1-2.
Configuring GTM to determine packet gateway health and availability, https://support.f5.com/kb/en-us/products/big-ip_gtm/manuals/product/gtm-implementations-11-6-0/9.html, downloaded circa Mar. 23, 2015, pp. 1-5.
ExtraHop-Arista Persistent Monitoring Architecture for SDN, downloaded circa Apr. 2, 2015, pp. 1-5.
7433 GTP Session Controller, www.ixia.com, downloaded circa Apr. 2, 2015, pp. 1-3.
Stateful GTP Correlation, https://www.gigamon.com/PDF/appnote/AN-GTP-Correlation-Stateful-Subscriber-Aware-Filtering-4025.pdf, date 2013, pp. 1-9.
GigaVUE-2404 // Data Sheet, www.gigamon.com, date Feb. 2014, pp. 1-6.
NGenius Performance Manager, www.netscout.com, date Mar. 2014, pp. 1-8.
GigaVUE-VM // Data Sheet, www.gigamon.com, date Oct. 2014, pp. 1-3.
Unified Visibility Fabric an Innovative Approach, https://www.gigamon.com/unified-visibility-fabric, Downloaded circa Mar. 30, 2015, pp. 1-4.
adaptiv.io and Apsalar Form Strategic Partnership to Provide Omni-channel Mobile Data Intelligence, http://www.businesswire.com/news/home/20150113005721/en/adaptiv.io-Apsalar-Form-Strategic-Partnership-Provide-Omni-channel, Downloaded circa Mar. 30, 2015, pp. 1-2.
Real-time Data Analytics with IBM InfoSphere Streams and Brocade MLXe Series Devices, www.brocade.com, date 2011, pp. 1-2.
Syniverse Proactive Roaming Data Analysis—VisProactive, http://m.syniverse.com/files/service_solutions/pdf/solutionsheet_visproactive_314.pdf.,date 2014, pp. 1-3.
Network Analytics: Product Overview, www.sandvine.com, date Apr. 28, 2014, pp. 1-2.
Non-Final Office Action for U.S. Appl. No. 15/043,421 dated Apr. 13, 2016, 18 pages.
U.S. Appl. No. 61/919,244, filed Dec. 20, 2013 by Chen et al.
U.S. Appl. No. 61/932,650, filed Jan. 28, 2014 by Munshi et al.
U.S. Appl. No. 61/994,693, filed May 16, 2014 by Munshi et al.
U.S. Appl. No. 62/088,434, filed Dec. 5, 2014 by Hsu et al.
U.S. Appl. No. 62/137,073, filed Mar. 23, 2015 by Chen et al.
U.S. Appl. No. 62/137,084, filed Mar. 23, 2015 by Chen et al.
U.S. Appl. No. 62/137,096, filed Mar. 23, 2015 by Laxman et al.
U.S. Appl. No. 62/137,106, filed Mar. 23, 2015 by Laxman et al.
PCT Patent Application No. PCT/US2015/012915 filed on Jan. 26, 2015 by Hsu et al.
U.S. Appl. No. 14/320,138, filed Jun. 30, 2014 by Chen et al.
Non-Final Office Action for U.S. Appl. No. 11/827,524 dated Dec. 10, 2009, 15 pages.

(56) References Cited

OTHER PUBLICATIONS

Non-Final Office Action for U.S. Appl. No. 11/827,524 dated Jun. 2, 2010, 14 pages.
Non-Final Office Action for U.S. Appl. No. 11/827,524 dated Nov. 26, 2010, 16 pages.
Final Office Action for U.S. Appl. No. 11/827,524 dated May 6, 2011, 19 pages.
Advisory Action for U.S. Appl. No. 11/827,524 dated Jul. 14, 2011, 5 pages.
Non-Final Office Action for U.S. Appl. No. 11/827,524 dated Oct. 18, 2012, 24 pages.
Notice of Allowance for U.S. Appl. No. 11/827,524 dated Jun. 25, 2013, 11 pages.
Non-Final Office Action for U.S. Appl. No. 14/030,782 dated Oct. 6, 2014, 14 pages.
IBM User Guide, Version 2.1AIX, Solaris and Windows NT, Third Edition (Mar. 1999) 102 Pages.
White Paper, Foundry Networks, "Server Load Balancing in Today's Web-Enabled Enterprises" Apr. 2002 10 Pages.
International Search Report & Written Opinion for PCT Application PCT/US2015/012915 dated Apr. 10, 2015, 15 pages.
Gigamon: Vistapointe Technology Solution Brief; Visualize-Optimize-Monetize-3100-02; Feb. 2014; 2 pages.
Gigamon: Netflow Generation Feature Brief; 3099-04; Oct. 2014; 2 pages.
Gigamon: Unified Visibility Fabric Solution Brief; 3018-03; Jan. 2015; 4 pages.
Gigamon: Active Visibility for Multi-Tiered Security Solutions Overview; 3127-02; Oct. 2014; 5 pages.
Gigamon: Enabling Network Monitoring at 40Gbps and 100Gbps with Flow Mapping Technology White Paper; 2012; 4 pages.
Gigamon: Enterprise System Reference Architecture for the Visibility Fabric White Paper; 5005-03; Oct. 2014; 13 pages.
Gigamon: Gigamon Intelligent Flow Mapping White Paper; 3039-02; Aug. 2013; 7 pages.
Gigamon: Maintaining 3G and 4G LTE Quality of Service White Paper; 2012; 4 pages.
Gigamon: Monitoring, Managing, and Securing SDN Deployments White Paper; 3106-01; May 2014; 7 pages.
Gigamon: Service Provider System Reference Architecture for the Visibility Fabric White Paper; 5004-01; Mar. 2014; 11 pages.
Gigamon: Unified Visibility Fabric—A New Approach to Visibility White Paper; 3072-04; Jan. 2015; 6 pages.
Gigamon: The Visibility Fabric Architecture—A New Approach to Traffic Visibility White Paper; 2012-2013; 8 pages.
Ixia: Creating a Visibility Architecture—a New Perspective on Network Visibilty White Paper; 915-6581-01 Rev. A, Feb. 2014; 14 pages.
Gigamon: Unified Visibility Fabric; https://www.gigamon.com/unfied-visibility-fabric; Apr. 7, 2015; 5 pages.
Gigamon: Application Note Stateful GTP Correlation; 4025-02; Dec. 2013; 9 pages.
Brocade and IBM Real-Time Network Analysis Solution; 2011 Brocade Communications Systems, Inc.; 2 pages.
Ixia Anue GTP Session Controller; Solution Brief; 915-6606-01 Rev. A, Sep. 2013; 2 pages.
Netscout; Comprehensive Core-to-Access IP Session Analysis for GPRS and UMTS Networks; Technical Brief; Jul. 16, 2010; 6 pages.
Netscout: nGenius Subscriber Intelligence; Data Sheet; SPDS_001-12; 2012; 6 pages.
Gigamon: Visibility Fabric Architecture Solution Brief; 2012-2013; 2 pages.
Gigamon: Visibility Fabric; More than Tap and Aggregation.bmp; 2014; 1 page.
Ntop: Monitoring Mobile Networks (2G, 3G and LTE) using nProbe; http://www.ntop.org/nprobe/monitoring-mobile-networks-2g-3g-and-lte-using-nprobe; Apr. 2, 2015; 4 pages.
Gigamon: GigaVUE-HB1 Data Sheet; 4011-07; Oct. 2014; 4 pages.
Brocade IP Network Leadership Technology; Enabling Non-Stop Networking for Stackable Switches with Hitless Failover; 2010; 3 pages.
U.S. Appl. No. 60/998,410, filed Oct. 9, 2007 by Wang et al.
Non-Final Office Action for U.S. Appl. No. 13/584,534 dated Oct. 24, 2014, 24 pages.
Restriction Requirement for U.S. Appl. No. 13/584,534 dated Jul. 21, 2014, 5 pages.
Non-Final Office Action for U.S. Appl. No. 11/937,285 dated Jul. 6, 2009, 28 pages.
Final Office Action for U.S. Appl. No. 11/937,285 dated Mar. 3, 2010, 28 pages.
U.S. Appl. No. 15/205,889, filed Jul. 8, 2016 by Hegde et al.
U.S. Appl. No. 15/206,008, filed Jul. 8, 2016 by Hegde et al.
U.S. Appl. No. 14/603,304, NonFinal Office Action dated Aug. 1, 2016, 86 pages.
U.S. Appl. No. 14/320,138, Notice of Allowance dated Sep. 23, 2016, 17 pages.
Non-Final Office Action for U.S. Appl. No. 11/937,285 dated Aug. 17, 2010, 28 pages.
Final Office Action for U.S. Appl. No. 11/937,285 dated Jan. 20, 2011, 41 pages.
Final Office Action for U.S. Appl. No. 11/937,285 dated May 20, 2011, 37 pages.
Non-Final Office Action for U.S. Appl. No. 11/937,285 dated Nov. 28, 2011, 40 pages.
Notice of Allowance for U.S. Appl. No. 11/937,285 dated Jun. 5, 2012, 10 pages.
Gigamon: Adaptive Packet Filtering; Feature Brief; 3098-03 Apr. 2015; 3 pages.
Final Office Action for U.S. Appl. No. 14/030,782 dated Jul. 29, 2015, 14 pages.
Final Office Action for U.S. Appl. No. 13/584,534 dated Jun. 25, 2015, 21 pages.
U.S. Appl. No. 14/603,304, filed Jan. 22, 2015, by Hsu et al.
U.S. Appl. No. 14/848,586, filed Sep. 8, 2015, by Chen et al.
U.S. Appl. No. 14/848,645, filed Sep. 8, 2015, by Chen et al.
Notice of Allowance for U.S. Appl. No. 13/584,534 dated Jan. 6, 2016, 4 pages.
U.S. Appl. No. 12/272,618, Final Office Action dated May 5, 2014, 13 pages.
U.S. Appl. No. 12/272,618, NonFinal Office Action dated Jul. 29, 2013, 13 pages.
U.S. Appl. No. 12/272,618, NonFinal Office Action dated Jan. 12, 2015, 5 pages.
U.S. Appl. No. 12/272,618, Notice of Allowance dated Aug. 26, 2015, 11 pages.
U.S. Appl. No. 12/272,618, Final Office Action dated Feb. 28, 2012, 12 pages.
U.S. Appl. No. 13/925,670, NonFinal Office Action dated Nov. 16, 2015, 48 pages.
U.S. Appl. No. 14/230,590, Notice of Allowance dated Sep. 23, 2015, 8 pages.
U.S. Appl. No. 15/043,421, Notice of Allowance dated Jun. 27, 2016, 21 pages.
69—International Search Report & Written Opinion for PCT Application PCT/US2017/025998 dated Jul. 20, 2017, 8 pages.
70—Ixia & Vectra, Complete Visibility for a Stronger Advanced Persistent Threat (APT) Defense, pp. 1-2, May 30, 2016.
71—Extended European Search Report & Opinion for EP Application 17000212.5 dated Aug. 1, 2017, 9 pages.
72—Extended European Search Report & Opinion for EP Application 17000213.3 dated Aug. 1, 2017, 7 pages.
U.S. Appl. No. 15/466,732, filed Mar. 22, 2017 by Hegde et al.
U.S. Appl. No. 15/467,766, filed Mar. 23, 2017 by Nagaraj et al.
U.S. Appl. No. 15/425,777, filed Feb. 6, 2017, by Chen et al.
Joshi et al.: A Review of Network Traffic Analysis and Prediction Techniques; arxiv.org; 2015; 22 pages.
Anjali et al.: MABE: A New Method for Available Bandwidth Estimation in an MPLS Network; submitted to World Scientific on Jun. 5, 2002; 12 pages.
Cisco Nexus Data Broker: Scalable and Cost-Effective Solution for Network Traffic Visibility; Cisco 2015; 10 pages.

(56) References Cited

OTHER PUBLICATIONS

VB220-240G Modular 10G/1G Network Packet Broker; VSS Monitoring; 2016, 3 pages.
Big Tap Monitoring Fabric 4.5; Big Switch Networks; Apr. 2015; 8 pages.
Gigamon Intelligent Flow Mapping—Whitepaper; 3039-04; Apr. 2015; 5 pages.
Ixia White Paper; The Real Secret to Securing Your Network; Oct. 2014; 16 pages.
Accedian—Solution Brief; FlowBROKER; Feb. 2016; 9 pages.
Network Time Machine for Service Providers; NETSCOUT; http://enterprise.netscout.com/telecom-tools/lte-solutions/network-time-machine-service-providers; Apr. 18, 2017; 8 pages.
Arista EOS Central—Introduction to TAP aggregation; https://eos.arista.com/introduction-to-tap-aggregation/; Apr. 18, 2017; 6 pages.
Brocade Session Director—Data Sheet; 2016; https://www.brocade.com/content/dam/common/documents/content-types/datasheet/brocade-session-director-ds.pdf; 5 pages.
Ixia—Evaluating Inline Security Fabric: Key Considerations; White Paper; https://www.ixiacom.com/sites/default/files/2016-08/915-8079-01-S-WP-Evaluating%20Inline%20Security%20Fabric_v5.pdf; 10 pages.
Next-Generation Monitoring Fabrics for Mobile Networks; Big Switch Networks—White Paper; 2014; 9 pages.
Gigamon Adaptive Packet Filtering; Jan. 25, 2017; 3 pages.
VB220 Modular 10G.1G Network Packet Broker Datasheet; VSS Monitoring; 2016; 8 pages.
FlexaWare; FlexaMiner Packet Filter FM800PF; Jan. 27, 2017; 5 pages.
GL Communications Inc.; PacketBroker—Passive Ethernet Tap; Jan. 27, 2017; 2 pages.
U.S. Appl. No. 15/336,333, filed Oct. 27, 2016 by Vedam et al.
U.S. Appl. No. 14/603,304, Notice of Allowance dated Jan. 11, 2017, 13 pages.
Krishnan et al.: "Mechanisms for Optimizing LAG/ECMP Component Link Utilization in Networks", Oct. 7, 2014, 27 pages, https://tools.ietf.org/html/draft-ietf-opsawg-large-flow-load-balancing-15.
U.S. Appl. No. 14/927,484, NonFinal Office Action dated Aug. 9, 2017, 77 pages.

* cited by examiner

TECHNIQUES FOR USER-DEFINED TAGGING OF TRAFFIC IN A NETWORK VISIBILITY SYSTEM

CROSS REFERENCES TO RELATED APPLICATIONS

The present application claims the benefit and priority under 35 U.S.C. 119(e) of U.S. Provisional Application No. 62/137,106, filed Mar. 23, 2015, entitled "TECHNIQUES FOR USER-DEFINED TAGGING OF TRAFFIC IN A NETWORK VISIBILITY SYSTEM." In addition, the present application is related to the following commonly-owned U.S. patent applications:

1. U.S. application Ser. No. 14/603,304, filed Jan. 22, 2015, now U.S. Pat. No. 9,648,542, issued May 9, 2017, entitled "SESSION-BASED PACKET ROUTING FOR FACILITATING ANALYTICS";
2. U.S. application Ser. No. 14/848,586, filed concurrently with the present application, entitled "TECHNIQUES FOR EXCHANGING CONTROL AND CONFIGURATION INFORMATION IN A NETWORK VISIBILITY SYSTEM"; and
3. U.S. application Ser. No. 14/848,645, filed concurrently with the present application, entitled "TECHNIQUES FOR EFFICIENTLY PROGRAMMING FORWARDING RULES IN A NETWORK SYSTEM."

The entire contents of the foregoing provisional and nonprovisional applications are incorporated herein by reference for all purposes.

BACKGROUND

Unless expressly indicated herein, the material presented in this section is not prior art to the claims of the present application and is not admitted to be prior art by inclusion in this section.

Figure 1:
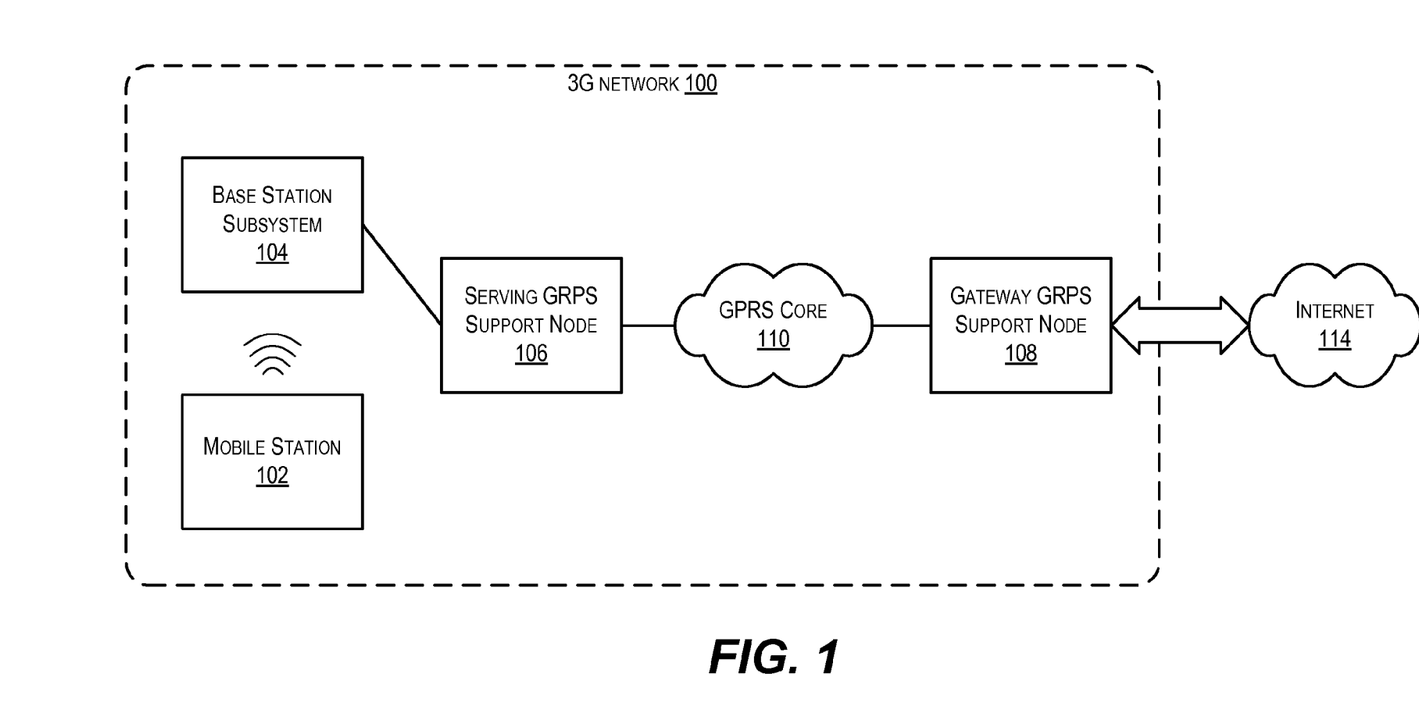
FIG. 1 depicts an exemplary 3G network.

General Packet Radio Service (GPRS) is a standard for wireless data communications that allows 3G and 4G/LTE mobile networks to transmit Internet Protocol (IP) packets to external networks such as the Internet. FIG. 1 is a simplified diagram of an exemplary 3G network 100 that makes use of GPRS. As shown, 3G network 100 includes a mobile station (MS) 102 (e.g., a cellular phone, tablet, etc.) that is wirelessly connected to a base station subsystem (BSS) 104. BSS 104 is, in turn, connected to a serving GPRS support node (SGSN) 106, which communicates with a gateway GPRS support node (GGSN) 108 via a GPRS core network 110. Although only one of each of these entities is depicted in FIG. 1, it should be appreciated that any number of these entities may be supported. For example, multiple MSs 102 may connect to each BSS 104, and multiple BSSs 104 may connect to each SGSN 106. Further, multiple SGGNs 106 may interface with multiple GGSNs 108 via GPRS core network 110.

When a user wishes to access Internet 114 via MS 102, MS 102 sends a request message (known as an "Activate PDP Context" request) to SGSN 106 via BSS 104. In response to this request, SGSN 106 activates a session on behalf of the user and exchanges GPRS Tunneling Protocol (GTP) control packets (referred to as "GTP-C" packets) with GGSN 108 in order to signal session activation (as well as set/adjust certain session parameters, such as quality-of-service, etc.). The activated user session is associated with a tunnel between SGSN 106 and GGSN 108 that is identified by a unique tunnel endpoint identifier (TEID). In a scenario where MS 102 has roamed to BSS 104 from a different BSS served by a different SGSN, SGSN 106 may exchange GTP-C packets with GGSN 108 in order to update an existing session for the user (instead of activating a new session).

Once the user session has been activated/updated, MS 102 transmits user data packets (e.g., IPv4, IPv6, or Point-to-Point Protocol (PPP) packets) destined for an external host/network to BSS 104. The user data packets are encapsulated into GTP user, or "GTP-U," packets and sent to SGSN 106. SGSN 106 then tunnels, via the tunnel associated with the user session, the GTP-U packets to GGSN 108. Upon receiving the GTP-U packets, GGSN 108 strips the GTP header from the packets and routes them to Internet 114, thereby enabling the packets to be delivered to their intended destinations.

The architecture of a 4G/LTE network that makes uses of GPRS is similar in certain respects to 3G network 100 of FIG. 1. However, in a 4G/LTE network, BSS 104 is replaced by an eNode-B, SGSN 106 is replaced by a mobility management entity (MME) and a Serving Gateway (SGW), and GGSN 108 is replaced by a packet data network gateway (PGW).

For various reasons, an operator of a mobile network such as network 100 of FIG. 1 may be interested in analyzing traffic flows within the network. For instance, the operator may want to collect and analyze flow information for network management or business intelligence/reporting. Alternatively or in addition, the operator may want to monitor traffic flows in order to, e.g., detect and thwart malicious network attacks.

Figure 2:
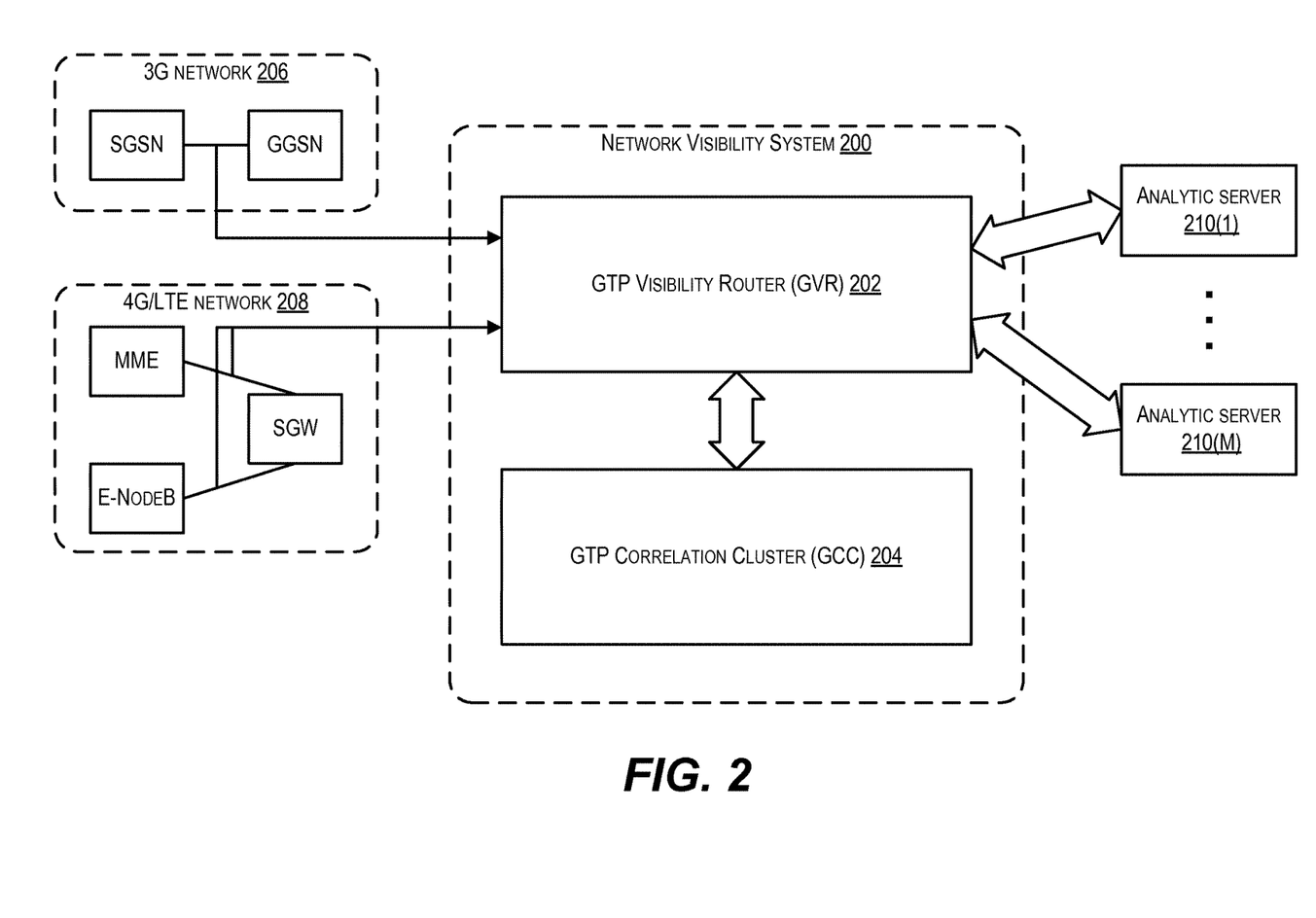
FIG. 2 depicts a network visibility system according to an embodiment.

To facilitate these and other types of analyses, the operator can implement a network telemetry, or "visibility," system, such as system 200 shown in FIG. 2 according to an embodiment. At a high level, network visibility system 200 can intercept traffic flowing through one or more connected networks (in this example, GTP traffic between SGSN-GGSN pairs in a 3G network 206 and/or GTP traffic between eNodeB/MME-SGW pairs in a 4G/LTE network 208) and can intelligently distribute the intercepted traffic among a number of analytic servers 210(1)-(M). Analytic servers 210(1)-(M), which may be operated by the same operator/service provider as networks 206 and 208, can then analyze the received traffic for various purposes, such as network management, reporting, security, etc.

In the example of FIG. 2, network visibility system 200 comprises two components: a GTP Visibility Router (GVR) 202 and a GTP Correlation Cluster (GCC) 204. GVR 202 can be considered the data plane component of network visibility system 200 and is generally responsible for receiving and forwarding intercepted traffic (e.g., GTP traffic tapped from 3G network 206 and/or 4G/LTE network 208) to analytic servers 210(1)-(M).

GCC 204 can be considered the control plane of network visibility system 200 and is generally responsible for determining forwarding rules on behalf of GVR 202. Once these forwarding rules have been determined, GCC 204 can program the rules into GVR 202's forwarding tables (e.g., content-addressable memories, or CAMs) so that GVR 202 can forward network traffic to analytic servers 210(1)-(M) according to customer (e.g., network operator) requirements. As one example, GCC 204 can identify and correlate GTP-U packets that belong to the same user session but include different source (e.g., SGSN) IP addresses. Such a situation may occur if, e.g., a mobile user starts a phone call in one wireless access area serviced by one SGSN and then roams, during the same phone call, to a different wireless access area serviced by a different SGSN. GCC 204 can then create and program "dynamic" forwarding rules in GVR 202 that ensure these packets (which correspond to the same user session) are all forwarded to the same analytic server for consolidated analysis.

Additional details regarding an exemplary implementation of network visibility system 200, as well as the GTP correlation processing attributed to GCC 204, can be found in commonly-owned U.S. patent application Ser. No. 14/603,304, entitled "SESSION-BASED PACKET ROUTING FOR FACILITATING ANALYTICS," the entire contents of which are incorporated herein by reference for all purposes.

In certain embodiments, as part of the traffic analysis performed by analytic servers 210(1)-(M), servers 210(1)-(M) may be interested in categorizing the data packets they receive from GVR 202 according to various criteria. For instance, analytic servers 210(1)-(M) may want to categorize the data packets based on the physical network path, or "circuit," they originated from in 3G network 206 or 4G/LTE network 208. Analytic servers 210(1)-(M) can then use this information to facilitate their analyses. By way of example, assume that an analytic server 210 sees that data packets in a certain flow are being dropped or delayed. In this case, if the data packets are categorized according to their point of origin in source network 306 or 208, the analytic server can determine that there is a problem with the physical network path/circuit from which the affected data packets originated. The network provider can thereafter take appropriate steps for addressing the problem with that particular circuit.

One issue with performing this packet categorization on analytic servers 210(1)-(M) is that the analytic servers may not have sufficient compute resources to perform the categorization in an efficient manner. This may be particularly true if a high volume of traffic is sent from GVR 202 to servers 210(1)-(M) on a continuous basis. Another issue with performing this packet categorization on analytic servers 210(1)-(M) is that the analytic servers may not have access to all of the information needed to successfully carry out the categorization task. For instance, in the example above where analytic servers 210(1)-(M) are interested in categorizing data packets according to the network circuit their originated from in source networks 206/208, servers 210(1)-(M) may not be able to ascertain the source circuit for each data packet without knowing which ingress port of GVR 202 received the packet. This ingress port information would only be known to the components of network visibility system 200 (i.e., GVR 202 and GCC 204).

SUMMARY

Techniques for enabling user-defined tagging of traffic in a network visibility system are provided. In one embodiment, a data plane component of the network visibility system can receive a data packet tapped from a source network. The data plane component can further match the data packet with an entry in a rule table, where the entry includes one or more match parameters, and in response to the matching can tag the data packet with a zone identifier defined in the entry. The data plane component can then forward the tagged data packet to an analytic server for analysis.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for performing user-defined tagging of traffic that is received by a data plane component of a network visibility system (e.g., GVR 202 of system 200) and forwarded to one or more analytic servers (e.g., servers 210(1)-(M)). In one set of embodiments, a user of the network visibility system can define a set of rules that assign "zone identifiers" to incoming packets at the data plane component based on various criteria (e.g., the ingress ports on which the packets are received, source IP addresses, destination IP addresses, etc.). Each zone identifier can correspond to a packet categorization, or class, that is known to the analytic severs. For example, in a particular embodiment, each zone identifier can identify a physical network circuit from which the packet originated in a tapped source network (e.g., network 206 or 208 of FIG. 2). The rules comprising the zone identifiers can be maintained on the control plane component of the network visibility system and can be programmed into an appropriate rule table (referred to herein as a "zoning table") of the data plane component at, e.g., system boot-up/initialization.

Then, during runtime of the network visibility system, the data plane component can receive a data packet from a tapped source network and can attempt to match the data packet against the rules in the zoning table. If a match is made, the data plane component can tag the data packet with the zone identifier included in the matched rule. The data plane component can insert the zone identifier into any of a number of existing fields in the data packet. For example, in embodiments where the data packet is a GTP packet, the data plane component can insert the zone identifier in an inner VLAN ID field of the GTP packet. Finally, the data plane component can send the tagged data packet through the remainder of its forwarding pipeline, which causes the data packet to be forwarded to a particular analytic server. Upon receiving the tagged data packet, the analytic server can extract the zone identifier from the packet and use the extracted zone identifier to assign an appropriate categorization/classification to the packet for analysis purposes.

With the approach described above, the data plane component of the network visibility system (in cooperation with the control plane component) can efficiently handle the task of categorizing incoming traffic via the user-defined zone identifiers, and can communicate these categorizations (in the form of the packet tags) to the analytic servers. Accordingly, there is no need for the analytic servers to dedicate compute resources to this task; the analytic servers need only extract the zone identifiers from the received packets and apply them (if needed) as part of their analytic processing. Further, by performing this categorization on the data plane component rather than the analytic servers, the rules that are used to match zone identifiers to data packets can take advantage of information that is available to the data plane component, but may not be readily available to the analytic servers (such as the ingress ports of the data plane component on which the packets are received). Thus, this approach can enable certain types of packet categorization that otherwise would not be possible if performed solely on the analytic servers.

These and other aspects of the present disclosure are described in further detail in the sections that follow.

2. Network Visibility System Architecture and Runtime Workflow

Figure 3:
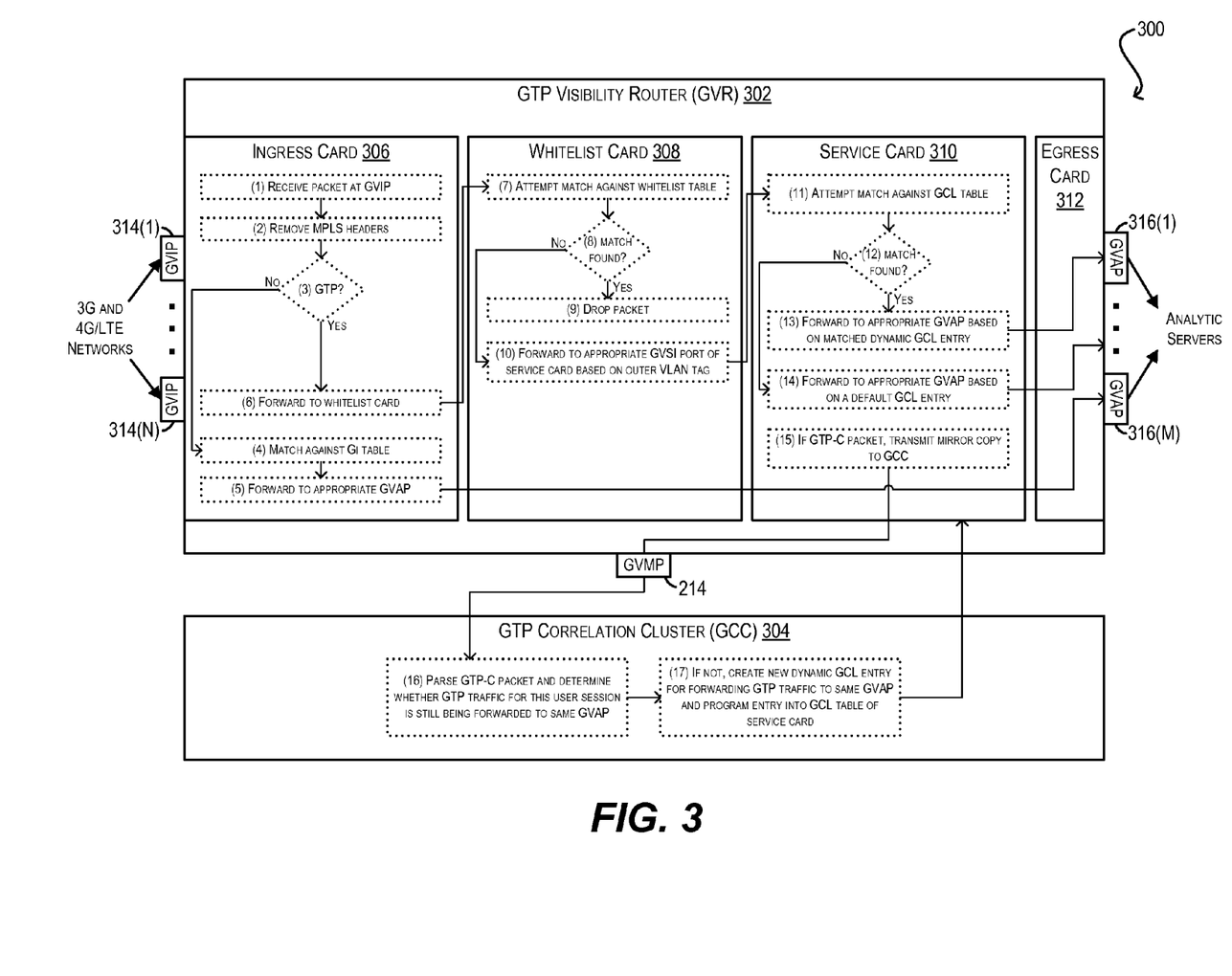
FIG. 3 depicts an architecture and runtime workflow for a specific network visibility system implementation according to an embodiment.

To provide context for the user-defined tagging techniques of the present disclosure, FIG. 3 depicts a more detailed representation of the architecture of network visibility system 200 of FIG. 2 (shown as network visibility system 300) and an exemplary runtime workflow that may be performed within system 300 according to an embodiment.

As shown in FIG. 3, network visibility system 300 comprises a GVR 302 and GCC 304. GVR 302 internally includes an ingress card 306, a whitelist card 308, a service card 310, and an egress card 312. In a particular embodiment, each card 306-312 represents a separate line card or I/O module in GVR 302. Ingress card 306 comprises a number of ingress (i.e., "GVIP") ports 314(1)-(N), which are communicatively coupled with one or more 3G and/or 4G/LTE mobile networks (e.g., networks 206 and 208 of FIG. 2). Further, egress card 312 comprises a number of egress (i.e., "GVAP") ports 316(1)-(M), which are communicatively coupled with one or more analytic servers (e.g., servers 210(1)-(M) of FIG. 2). Although only a single instance of ingress card 306, whitelist card 308, service card 310, and egress card 312 are shown, it should be appreciated that any number of these cards may be supported.

In operation, GVR 302 can receive an intercepted (i.e., tapped) network packet from 3G network 206 or 4G/LTE network 208 via a GVIP port 314 of ingress card 306 (step (1)). At steps (2) and (3), ingress card 306 can remove the received packet's MPLS headers and determine whether the packet is a GTP packet (i.e., a GTP-C or GTP-U packet) or not. If the packet is not a GTP packet, ingress card 306 can match the packet against a "Gi" table that contains forwarding rules (i.e., entries) for non-GTP traffic (step (4)). Based on the Gi table, ingress card 306 can forward the packet to an appropriate GVAP port 316 for transmission to an analytic server (e.g., an analytic server that has been specifically designated to process non-GTP traffic) (step (5)).

On the other hand, if the packet is a GTP packet, ingress card 306 forward the packet to whitelist card 308 (step (6)). At steps (7) and (8), whitelist card 308 can attempt to match the inner IP addresses (e.g., source and/or destination IP addresses) of the GTP packet against a "whitelist" table. The whitelist table, which may be defined by the network operator, comprises entries identifying certain types of GTP traffic that the network operator does not want to be sent to analytic servers 210 for processing. For example, the network operator may consider such traffic to be innocuous or irrelevant to the analyses performed by analytic servers 210. If a match is made at step (8), then the GTP packet is immediately dropped (step (9)). Otherwise, the GTP packet is forwarded to an appropriate service instance port (GVSI port) of service card 310 (step (10)). Generally speaking, service card 310 can host one or more service instances, each of which is identified by a "GVSI port" and is responsible for processing some subset of the incoming GTP traffic from 3G network 206 and 4G/LTE network 208 (based on, e.g., GGSN/SGW). In a particular embodiment, service card 310 can host a separate service instance (and GVSI port) for each hardware packet processor implemented on service card 310.

At steps (11) and (12), service card 310 can receive the GTP packet on the GVSI port and can attempt to match the packet against a "GCL" table defined for the service instance. The GCL table can include forwarding entries that have been dynamically created by GCC 304 for ensuring that GTP packets belonging to the same user session are all forwarded to the same analytic server (this is the correlation concept described in the Background section). The GCL table can also include default forwarding entries. If a match is made at step (12) with a dynamic GCL entry, service card 310 can forward the GTP packet to a GVAP port 316 based on the dynamic entry (step (13)). On the other hand, if no match is made with a dynamic entry, service card 310 can forward the GTP packet to a GVAP port 316 based on a default GCL entry (step (14)). For example, the default rule or entry may specify that the packet should be forwarded to a GVAP port that is statically mapped to a GGSN or SGW IP address associated with the packet.

In addition to performing the GCL matching at step (12), service card 310 can also determine whether the GTP packet is a GTP-C packet and, if so, can transmit a copy of the packet to GCC 304 (step (15)). Alternatively, this transmission can be performed by whitelist card 308 (instead of service card 310). In a particular embodiment, service card 310 or whitelist card 308 can perform this transmission via a separate minor port, or "GVMP," 318 that is configured on GVR 302 and connected to GCC 304. Upon receiving the copy of the GTP-C packet, GCC 304 can parse the packet and determine whether the GTP traffic for the user session associated with the current GTP-C packet will still be sent to the same GVAP port or not (step (16)). As mentioned previously, in cases where a user roams, the SSGN source IP addresses for GTP packets in user session may change, potentially leading to a bifurcation of that traffic to two or more GVAP ports (and thus, two or more different analytic servers). If the GVAP port has changed, GCC 304 can determine a new dynamic GCL entry that ensures all of the GTP traffic for the current user session is sent to the same GVAP port. GCC 304 can then cause this new dynamic GCL entry to be programmed into the dynamic GCL table of service card 310 (step (17)). Thus, all subsequent GTP traffic for the same user session will be forwarded based on this new entry at steps (11)-(13).

3. User-Defined Tagging

As mentioned previously, once analytic servers 210 have received the GTP packets forwarded by network visibility system 300, the analytic servers can analyze the packets for various purposes (e.g., network management, reporting, security, etc.). As part of this process, analytic servers 210 may find it useful to categorize the received packets according to one or more criteria. For example, in one embodiment, analytic servers 210 may wish to categorize the packets based on the network circuit that they originated from in networks 206/208. Unfortunately, this categorization task can place a large amount of strain on servers 210, and may require access to information, such as network flow characteristics, that are only available to the components of network visibility system 300.

Figure 4:
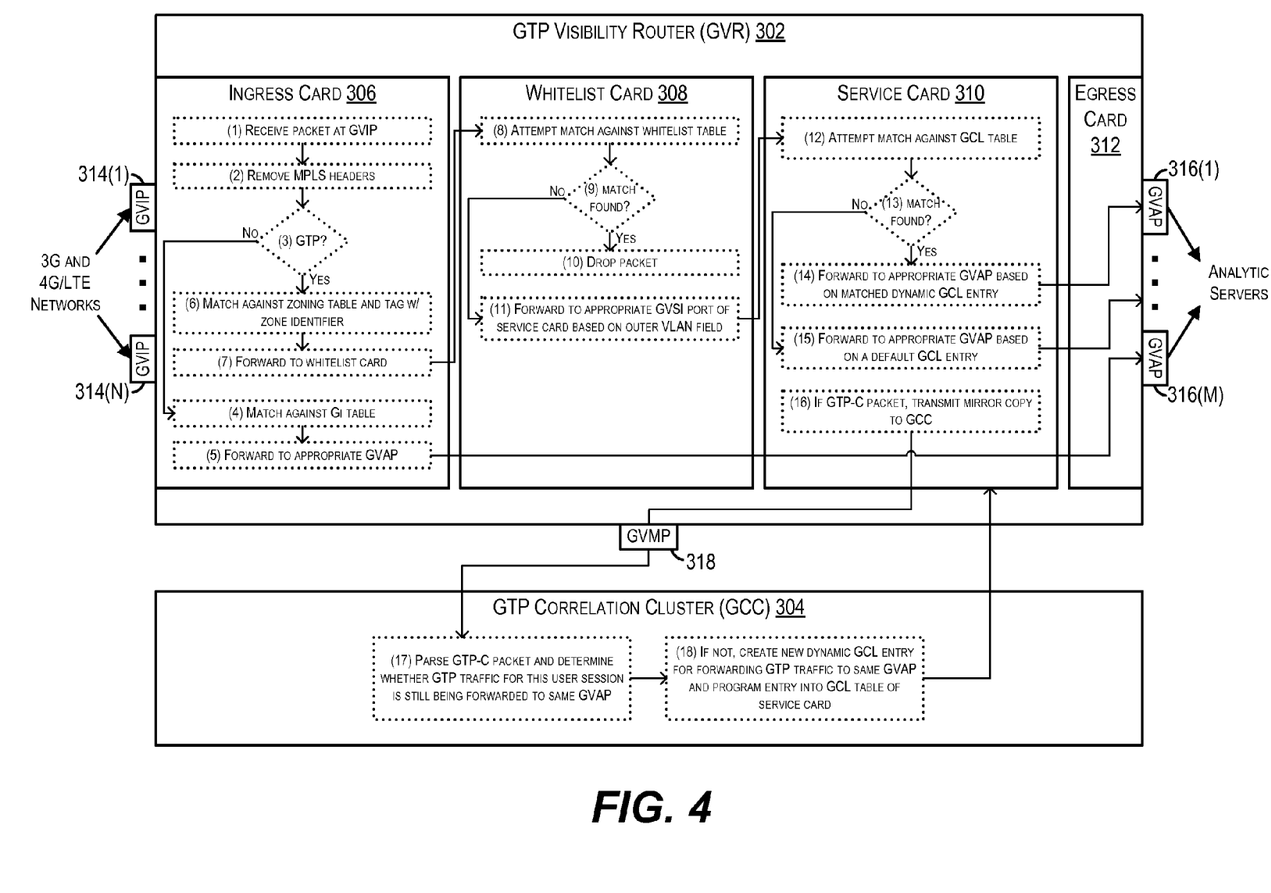
FIG. 4 depicts a modified version of the workflow of FIG. 3 that supports user-defined packet tagging according to an embodiment.

To address this, GVR 302 can implement a modified runtime workflow that supports user-defined packet tagging. This modified workflow is depicted in FIG. 4 according to an embodiment. With the workflow shown in FIG. 4, GVR 302 can tag the packets received from 3G and 4G/LTE networks 206 and 208 with "zone identifiers" as the packets are being passed through the GVR forwarding pipeline. These zone identifiers, which can be defined by a user (e.g., a network operator or administrator), can correspond to packet categorizations, or classes, that are known to analytic servers 210. GVR 302 can then forward the tagged packets to analytic servers 210. Upon receiving a tagged packet from GVR 302, each analytic server can extract the zone identifier from the packet and leverage the zone identifier (if needed) for its analytic processing. For instance, in embodiments where the zone identifiers identify the circuit of origin of each packet, the analytic servers can use the zone identifiers to correlate problematic packets/packet flows with their associated network circuits. In this way, the analytic servers can take appropriate steps to address any network problems that may exist with those circuits.

Steps (1)-(5) in the runtime workflow of FIG. 4 are substantially similar to the runtime workflow of FIG. 3. At step (6) of FIG. 4, if ingress card 306 determines that the received packet is a GTP packet, ingress card 306 can attempt to match the packet against a "zoning table" that is resident on ingress card 306, rather than sending the packet directly to whitelist card 308. This zoning table (which may be implemented using, e.g., a TCAM on ingress card 306) can comprise entries corresponding to "zoning" rules. Each zoning entry/rule in the zoning table can include one or more match parameters that are used to match the entry/rule against incoming packets, as well as a zone identifier to be added (i.e., tagged) to a matched packet. Thus, the match parameters represent the criteria that a given packet must satisfy in order to be tagged with the corresponding zone identifier. The zone identifiers represent different packet categorizations that are understood by analytic servers 210, such as circuit of origin, application type, quality of service, etc.

Generally speaking, the match parameters and zone identifiers for each entry/rule in the zoning table will be user-defined (by, e.g., a network operator or administrator) and will differ depending on the particular categorization task that needs to be performed by GVR 302. For example, in a scenario where the network operator desires incoming packets to be categorized based their circuit of origin in source network 206 or 208, the network operator can define a plurality of zoning entries/rules where the match parameters for each entry/rule includes (1) an ingress port of GVR 302 on which a packet is received, and (2) a source IP address prefix or a destination IP address prefix. In this example, the source IP address prefix can identify a range of GGSNs or SGWs from which the packet originated, and the destination IP address prefix can identify a range of GGSNs or SGWs to which the packet is directed. By matching against these parameters, GVR 302 can classify incoming packets based on the portion of network 206/208 from which the packet was tapped, as well as the direction of travel of the packet (i.e., whether the packet was travelling upstream towards the GGSN/SGW, or downstream away from the GGSN/SGW). GVR 302 can then tag each matched packet with a unique zone identifier associated with that network portion and travel direction (per the zoning entry/rule). In one embodiment, GVR 302 can include the zone identifier in an inner VLAN ID field of the packet. In other embodiments, GVR 302 can include in the zone identifier in any other portion of the packet that will be accessible by analytic servers 210.

It should be noted that, in certain embodiments, the rules/entries in the zoning table can originate from user-defined configuration data that is maintained on GCC 304. These rules can be communicated from GCC 304 to GVR 302 (in the form of, e.g., a zoning access control list, or ACL) and programmed into the zoning table at the time GVR 302 and GCC 304 are initialized/booted up. Additional information regarding the format for this configuration data is provided in subsection 3.1 below.

In addition, each entry/rule in the zoning table can include other fields beyond the match parameters and zone identifier mentioned above. For example, in the example of FIG. 4, each zoning entry/rule can further include a GVSI port that identifies the service instance of GVR 302 that should process the matched packet (i.e., determine which egress port, and thus analytic server, the packet should be forwarded to), well as a whitelist port that identifies the ingress port of whitelist card 308. In this embodiment, GVR 302 can include the GVSI port in an outer VLAN ID field of the packet.

At step (7), once the packet has been matched with an entry/rule in the zoning table and tagged as described above, ingress card 306 can send the tagged packet to whitelist card 308 (based on, e.g., the whitelist port identified in the matched zoning entry/rule) and through the remaining portions of GVR 302's forwarding pipeline in accordance with steps (8)-(18), which are substantially similar to steps (6)-(17) of FIG. 3. At the end of this workflow, the tagged packet will be forwarded out one of the GVAP ports 416 to a particular analytic server 210 for analysis. Upon receiving the tagged packet, the analytic server can extract the zone identifier from the packet and use the zone identifier, as needed, for categorizing the packet as part of its analytic processing.

It should be appreciated that the workflow shown in FIG. 4 is illustrative and various modifications are possible. For example, although step (6) (i.e., matching the packet against the zoning table and tagging the packet) is shown as being performed by ingress card 306, in alternative embodiments this step can be performed by another line card on GVR 302, such as whitelist card 308, service card 310, egress card 312, or a standalone "zoning card" (not shown). For example, such a standalone card can be inserted in the path between whitelist card 308 and service card 310. By performing tagging in a standalone card that is positioned after whitelist card 308, dropped packets would no longer be tagged, thus reducing the processing performed by GVR 302 and resulting in an improvement in the performance of GVR 302. One of ordinary skill in the art will recognize other modifications, variations, and alternatives.

Figure 5:
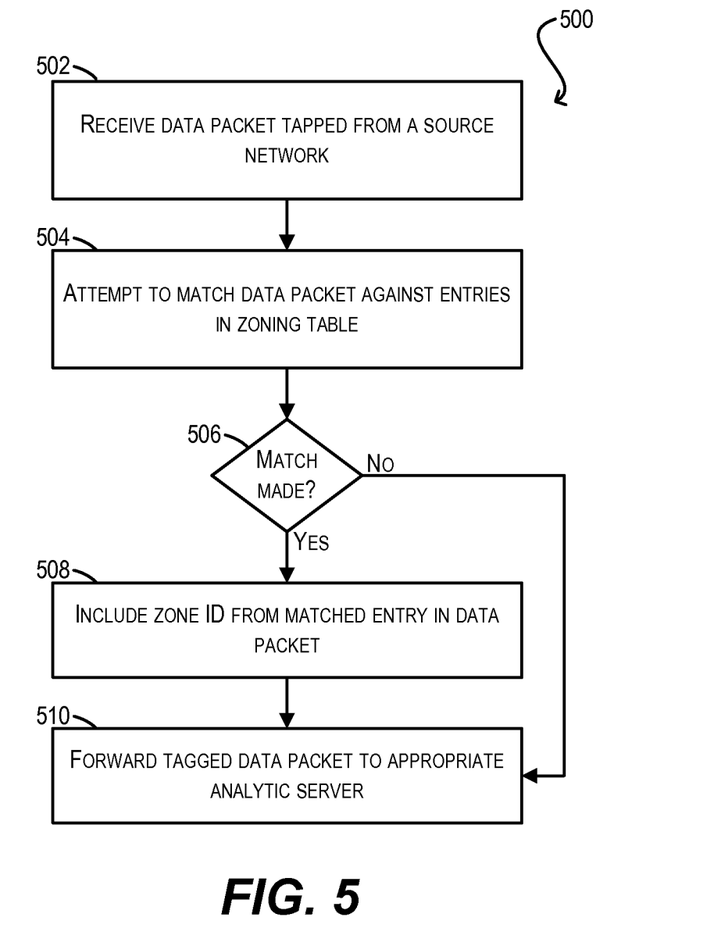
FIG. 5 depicts a high-level flowchart for performing user-defined tagging of traffic in a network visibility system according to an embodiment.

FIG. 5 depicts a high-level flowchart 500 of the tagging functionality attributed to GVR 302 in FIG. 4 according to one embodiment. Flowchart 500 assumes that the zoning table of the GVR has been programmed with appropriate zoning entries/rules as described with respect to FIG. 4.

Starting with block 502, GVR 302 can receive a data packet tapped from a source network (e.g., 3G network 206 or 4G/LTE network 208). The packet can be received via one of the ingress (GVIP) ports of the GVR.

At block 504, GVR 302 can attempt to match the data packet with a plurality of entries in a zoning table maintained on the GVR. As mentioned previously, each zoning entry can be user-defined and can include a plurality of match parameters and a zone identifier. As part of block 504, GVR 302 can attempt to match the match parameters in each zoning entry against corresponding fields in the received data packet.

If a match is made, GVR 302 can include the zone identifier in the matched zoning entry in the data packet (in other words, tag the packet with the zone identifier) (blocks 506 and 508). In embodiments where the packet is a GTP packet, GVR 302 can include the zone identifier in an inner VLAN ID field of the GTP packet. In other embodiments, GVR 302 can include the zone identifier in any other packet field. GVR 302 can then cause the tagged data packet to be forwarded to an appropriate analytic server for processing (block 510). Although not shown, once the analytic server has received the tagged data packet, the server can retrieve the zone identifier and apply it as part of its analytic workflows. The particular manner in which the analytic server uses the zone identifier will differ depending on the identifier's nature and purpose. For instance, in cases where the zone identifier identifies a physical network circuit from which the packet originated, the analytic server can leverage the zone identifier to troubleshoot problems in that network circuit.

If no match is made at block 506, GVR 302 can simply forward the packet (without performing any tagging) to the analytic server per block 510 and flowchart 500 can end.

3.1 Zoning Entry/Rule Configuration Format

As noted previously, in certain embodiments the zoning entries/rules installed in the zoning table of GVR 302 can be generated from user-defined configuration data that is maintained on GCC 304. This user-defined configuration data can include, for each zoning entry/rule, a text string that defines the components of the rule. The following is an example format of such a text string for a zoning entry/rule according to an embodiment:

<IngressPort>, <SIP>, <SIPMask>, <DIP>, <DIPMask>, <Version>, <EgressVLAN>

As shown in this example, the text string includes an ingress port (IngressPort) field, a source IP address (SIP) field, a source IP Mask (SIPMask) field, a destination IP address (DIP) field, a destination IP Mask (DIPMask) field, a network version (Version) field, and a zone identifier ("EgressVLAN") field. The IngressPort, SIP, SIPMask, DIP, and DIPMask fields correspond to match parameters for this zoning entry/rule. In particular, the IngressPort field identifies an ingress port of GVR 302 on which a data packet may be received, the SIP and SIPMask fields identify a source IP address (or address range/prefix) for the packet, and the DIP and DIPMask fields identify a destination IP address (or address range/prefix) for the packet. If the corresponding fields of an incoming packet match these fields, the packet is tagged with the zone identifier included in the EgressVLAN field. In some cases, wildcard values can be provided for certain match fields, such that any values in an incoming packet will match the wildcarded fields.

The Version field indicates the type of network traffic to which this zoning entry/rule is applicable. In a particular embodiment, the Version field can be set to "1" if the entry/rule is applicable to 3G networks, set to "0" if the entry/rule is applicable to 4G/LTE networks, and set to "2" if the entry/rule is applicable to both 3G and 4G/LTE networks.

It should be appreciated that the zoning rule configuration format described above is illustrative and may vary depending on the nature of the packet categorization being performed via these entries/rules.

4. Network Switch

Figure 6:
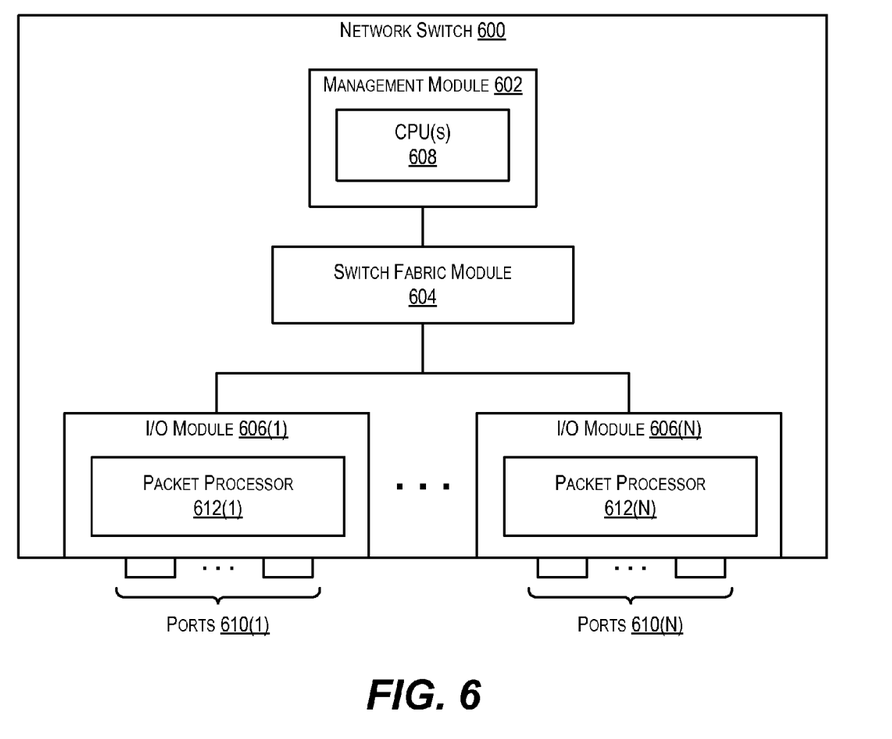
FIG. 6 depicts a network switch/router according to an embodiment.

FIG. 6 depicts an exemplary network switch 600 according to an embodiment. Network switch 600 can be used to implement, e.g., GVR 202/302 of FIGS. 2, 3, and 4.

As shown, network switch 600 includes a management module 602, a switch fabric module 604, and a number of I/O modules (i.e., line cards) 606(1)-606(N). Management module 602 includes one or more management CPUs 608 for managing/controlling the operation of the device. Each management CPU 608 can be a general purpose processor, such as a PowerPC, Intel, AMD, or ARM-based processor, that operates under the control of software stored in an associated memory (not shown).

Switch fabric module 404 and I/O modules 606(1)-606(N) collectively represent the data, or forwarding, plane of network switch 600. Switch fabric module 604 is configured to interconnect the various other modules of network switch 600. Each I/O module 606(1)-606(N) can include one or more input/output ports 610(1)-610(N) that are used by network switch 600 to send and receive data packets. Each I/O module 606(1)-606(N) can also include a packet processor 612(1)-612(N). Packet processor 612(1)-612(N) is a hardware processing component (e.g., an FPGA or ASIC) that can make wire speed decisions on how to handle incoming or outgoing data packets. In a particular embodiment, I/O modules 606(1)-606(N) can be used to implement the various types of line cards described with respect to GVR 302 in FIGS. 3 and 4 (e.g., ingress card 306, whitelist card 308, service card 310, and egress card 312).

It should be appreciated that network switch 600 is illustrative and not intended to limit embodiments of the present invention. Many other configurations having more or fewer components than switch 600 are possible.

5. Computer System

Figure 7:
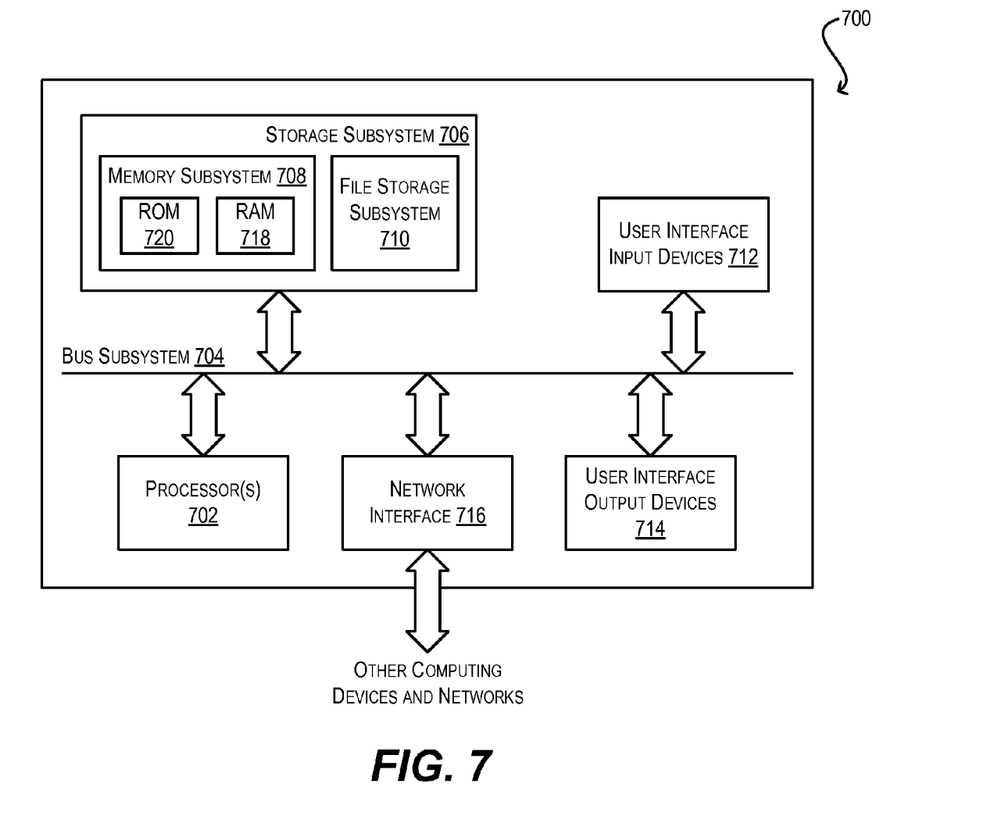
FIG. 7 depicts a computer system according to an embodiment.

FIG. 7 is a simplified block diagram of a computer system 700 according to an embodiment. Computer system 700 can be used to implement, e.g., GCC 204/304 of FIGS. 2, 3, and 4. As shown in FIG. 7, computer system 700 can include one or more processors 702 that communicate with a number of peripheral devices via a bus subsystem 704. These peripheral devices can include a storage subsystem 706 (comprising a memory subsystem 708 and a file storage subsystem 710), user interface input devices 712, user interface output devices 714, and a network interface subsystem 716.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple busses.

Network interface subsystem 716 can serve as an interface for communicating data between computer system 700 and other computing devices or networks. Embodiments of network interface subsystem 716 can include wired (e.g., coaxial, twisted pair, or fiber optic Ethernet) and/or wireless (e.g., Wi-Fi, cellular, Bluetooth, etc.) interfaces.

User interface input devices 712 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 700.

User interface output devices 714 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 700.

Storage subsystem 706 can include a memory subsystem 708 and a file/disk storage subsystem 710. Subsystems 708 and 710 represent non-transitory computer-readable storage media that can store program code and/or data that provide the functionality of various embodiments described herein.

Memory subsystem 708 can include a number of memories including a main random access memory (RAM) 718 for storage of instructions and data during program execution and a read-only memory (ROM) 720 in which fixed instructions are stored. File storage subsystem 710 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and not intended to limit embodiments of the present invention. Many other configurations having more or fewer components than computer system 700 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although GVR 202/302 and GCC 204/304 have generally been described as separate and distinct devices in network visibility system 200/300, in certain embodiments GVR 202/302 and GCC 204/304 can be implemented in the context of a single device. For instance, in one embodiment, GVR 202/302 and GCC 204/304 can be implemented as components in a single network switch/router (such as switch 600 of FIG. 6). In another embodiment, GVR 202/302 and GCC 204/304 can be implemented as components (e.g., virtual machines) within a single computer system (such as computer system 700 of FIG. 7). One of ordinary skill in the art will recognize many variations and modifications for the arrangement of network visibility system 200/300.

Further, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted.

Yet further, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   receiving, by a data plane component of a network visibility system, a data packet tapped from a source network;
   matching, by the data plane component, the data packet with an entry in a rule table, the entry including one or more match parameters;
   in response to the matching, tagging, by the data plane component, the data packet with a zone identifier defined in the entry, the zone identifier being a user-defined identifier that is used by an analytic server for categorizing the data packet; and
   forwarding, by the data plane component, the data packet with the zone identifier to the analytic server for analysis.

2. The method of claim 1 wherein the zone identifier identifies a physical circuit of the source network from which the data packet originated.

3. The method of claim 2 wherein the zone identifier further identifies whether the data packet was traveling in an upstream or downstream direction on the physical circuit.

4. The method of claim 1 wherein the data packet is a GPRS Tunneling Protocol (GTP) packet.

5. The method of claim 4 wherein tagging the data packet with the zone identifier comprises adding the zone identifier to an inner VLAN ID field of the GTP packet.

6. The method of claim 1 wherein the one or more match parameters include an ingress port of the data plane component.

7. The method of claim 6 wherein the one or more match parameters further include a source IP address prefix or a destination IP address prefix.

8. The method of claim 7 wherein the source network is a 3G or 4G/LTE wireless network, and wherein the source IP address prefix or destination IP address prefix corresponds to one or more gateway GPRS support nodes (GGSNs) or serving gateways (SGWs) in the source network.

9. The method of claim 1 wherein the entry is generated by a control plane component of the network visibility system and is communicated to the data plane component upon initialization.

10. The method of claim 9 wherein the entry is generated based on a user-defined configuration file that is maintained on the control plane component.

11. The method of claim 1 wherein the data plane component is a network switch or router, and wherein the rule table is resident on an ingress line card of the network switch or router.

12. A non-transitory computer readable storage medium having stored thereon program code executable by a data plane component of a network visibility system, the program code causing the data plane component to:
   receive a data packet tapped from a source network;
   match the data packet with an entry in a rule table, the entry including one or more match parameters;

in response to the matching, tagging the data packet with a zone identifier defined in the entry, the zone identifier being a user-defined identifier that is used by an analytic server for categorizing the data packet; and forwarding the data packet with the zone identifier to the analytic server for analysis.

13. The non-transitory computer readable storage medium of claim 12 wherein the zone identifier identifies a physical circuit of the source network from which the data packet originated.

14. The non-transitory computer readable storage medium of claim 12 wherein the data packet is a GPRS Tunneling Protocol (GTP) packet, and wherein tagging the data packet with the zone identifier comprises adding the zone identifier to an inner VLAN ID field of the GTP packet.

15. A device operable to act as a data plane component in a network visibility system, the device comprising:

a processor; and a non-transitory computer readable medium having stored thereon program code that, when executed by the processor, causes the processor to:

receive a data packet tapped from a source network;

match the data packet with an entry in a rule table, the entry including one or more match parameters;

in response to the matching, tagging the data packet with a zone identifier defined in the entry, the zone identifier being a user-defined identifier that is used by an analytic server for categorizing the data packet; and forwarding the data packet with the zone identifier to the analytic server for analysis.

16. The device of claim 15 wherein the zone identifier identifies a physical circuit of the source network from which the data packet originated.

17. The device of claim 15 wherein the data packet is a GPRS Tunneling Protocol (GTP) packet, and wherein tagging the data packet with the zone identifier comprises adding the zone identifier to an inner VLAN ID field of the GTP packet.

* * * * *